US012196387B2

(12) United States Patent
Göttlicher et al.

(10) Patent No.: US 12,196,387 B2
(45) Date of Patent: Jan. 14, 2025

(54) LIGHTING DEVICE FOR REAR-VIEW DEVICE OF VEHICLE

(71) Applicant: Motherson Innovations Company Limited, London (GB)

(72) Inventors: Stefanie Göttlicher, Bruchköbel (DE); Dominik Ernewein, Bruchköbel (DE); Oliver Schmidt, Stuttgart (DE); Alf Liesener, Bruchköbel (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/496,988

(22) Filed: Oct. 30, 2023

(65) Prior Publication Data

US 2024/0142079 A1 May 2, 2024

(30) Foreign Application Priority Data

Nov. 1, 2022 (DE) ..................... 10 2022 128 895.1

(51) Int. Cl.
*F21S 43/249* (2018.01)
*F21S 43/14* (2018.01)
(Continued)

(52) U.S. Cl.
CPC ............. *F21S 43/249* (2018.01); *F21S 43/14* (2018.01); *F21S 43/15* (2018.01); *F21S 43/31* (2018.01)

(58) Field of Classification Search
CPC .......... F21S 43/249; F21S 43/14; F21S 43/15; F21S 43/31
See application file for complete search history.

(56) References Cited

U.S. PATENT DOCUMENTS 5,844,479 A * 12/1998 Walton .................. B60Q 1/442 340/475
6,280,480 B1 * 8/2001 Tuttle .................. B60Q 1/2607 362/241
(Continued)

FOREIGN PATENT DOCUMENTS

DE 11 2008 002 757 11/2010
DE 10 2018 113 370 12/2019

OTHER PUBLICATIONS

German Patent Office, Appl. 10 2022 128 895.1, Office Action, Jun. 27, 2023.

*Primary Examiner* — Evan P Dzierzynski
(74) *Attorney, Agent, or Firm* — Jones Day

(57) ABSTRACT

The disclosure relates to a lighting device of a rear-view device adapted to be used with a vehicle comprising: at least two light sources arranged to emit light beams, wherein the at least two light sources comprise a first light source and a second light source, and the light beams comprise a first beam of light, in particular of a first color, and a second beam of light, in particular of a second color different from the first color; at least two lightguides, wherein the at least two lightguides comprises a first lightguide and a second lightguide; a housing, wherein the housing comprises an upper portion, a lower portion and a supporting element for, in particular detachably, supporting the at least two light sources and/or the at least two light guides; at least one reflective element, wherein the at least one reflective element is arranged to reflect at least a part of the light beams from one of the at least two light sources and is supported by the supporting element; a transparent lens arranged at least partly between the upper portion and the lower portion of the housing; and at least one pattern generating element configured to generate at least one light pattern using at least a part of the light beams from one of the at least two light
(Continued)

sources. The disclosure further relates to a rear-view device with at least one such lighting module and a vehicle with at least one such a rear-view device.

12 Claims, 5 Drawing Sheets

(51) Int. Cl.
*F21S 43/15* (2018.01)
*F21S 43/31* (2018.01)

(56) References Cited

U.S. PATENT DOCUMENTS

| | | | | |
|---|---|---|---|---|
| 11,052,826 | B2 * | 7/2021 | Huizen | F21S 43/237 |
| 2004/0190303 | A1 * | 9/2004 | Mishimagi | B60Q 1/2665 362/494 |
| 2010/0238015 | A1 * | 9/2010 | Fukasawa | B60R 1/1207 362/494 |
| 2014/0091915 | A1 * | 4/2014 | Rodriguez | B60R 1/1207 340/435 |
| 2019/0368689 | A1 * | 12/2019 | Rötzer | F21V 5/04 |

* cited by examiner

LIGHTING DEVICE FOR REAR-VIEW DEVICE OF VEHICLE

CROSS-REFERENCE TO RELATED APPLICATIONS

This application claims priority to German Patent Application No. DE 10 2022 128 895.1, filed on Nov. 1, 2022, which is incorporated herein by reference in its entirety.

FIELD

The disclosure relates to a lighting device for a rear-view device of a vehicle. More particularly, the disclosure relates to a lighting device for providing a turn light signal and other multi-functional light arrangements. It also relates to a rear-view device with such a lighting device and a vehicle with such a rear-view device.

BACKGROUND

Vehicles generally include rear-view devices mounted inside and outside the vehicle. The rear-view devices generally include one or more mirrors, cameras or any combination thereof for viewing a scenario at least around the rear-end of the vehicle and one or more lighting devices.

The term "vehicle" denotes any motor driven vehicle with or without trailers driven by a driver, where the driver requires information about people, other vehicles or objects in the (near) surrounding of the vehicle to be able to drive safety. As an example, vehicles are cars, trucks, tractors or trailers.

The term "rear-view" is here defined as a view of the surrounding area of a vehicle, which is not in the field of view of a driver of the vehicle, i.e. the directions opposing, left, right, below and above of the viewing direction, but may also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but may also relate to any other person or entity within or outside of the vehicle.

The term "light source" denotes a device from which light originates and is emitted. The light source may include one or more light emitting devices or solid-state light sources. The term "solid state" generally refers to light emitted by solid-state electroluminescence, as opposed to inmaydescent bulbs or fluorescent tubes. For example, the light source may include a semiconductor light emitting diode (LED) or laser diode, an OLED, polymer light emitting diode (PLED), an LED lamp package, LED chip or LED die, or an array of one or more of these devices. It should be understood that the light source may also include a color changing LED, that is the LED may be configured to change color when required.

The term "lightguide" denotes a light conducting element at least partly forming part of a housing, wherein the lightguide has a light receiving surface within an enclosure, which may be provided at least partly by the housing, and a light emitting surface outside the enclosure, such that light emitted from the light source is received by the light receiving surface of the lightguide and directed towards the light emitting surface of the lightguide, such that light is emitted from the lightguide. The lightguide may be made of transparent material. The light may be emitted from the lightguide with a uniform luminance throughout the light emitting surface.

The term "reflective element" denotes a reflective surface on which light, for example emitted from a lightguide, falls and gets reflected in a reflecting direction to emit a reflected light. The reflective element may be a polished or a coated surface providing a mirror-like surface finish.

Different functions and devices may be incorporated into and/or controlled with the help of a rear-view device. Of particular interest are functions and devices to enhance, extend and/or sustain the functionality of the rear-view device during normal or extreme conditions. The respective means may comprise heating and/or cooling means; cleaning means such as wipers, liquid and/or gaseous sprays; actuator means for moving the rear-view device or parts of it, such as for example a display, a camera system and/or parts of a camera system, comprising for example lenses, filters, light sources, adaptive optics like deformable mirrors, sensors and/or mirrors; and/or actuator means for inducing movement of other objects, for example parts of the vehicle and/or objects surrounding the vehicle. Furthermore, linear tracks and/or rotating wheels, like for example a filter wheel, for exchanging optical elements, comprising for example lenses, mirrors, light sources, sensors, adaptive optics like deformable mirrors and/or filters may be comprised.

Prominent examples for functions and devices incorporated into and/or controlled with the help of rear-view devices comprise lighting devices, for example in form of any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

In recent years, lighting devices for vehicles have become important for their aesthetic appeal to consumers. Thus, vehicle manufacturers have made efforts to design vehicle lighting devices in consideration of the styling of the vehicle on which the lighting devices are mounted. Further, vehicle manufacturers may provide optional lighting effects (in addition to the legally required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Aesthetic lighting effects lead to an even greater number of components and complexity. Such vehicle lighting devices are not easily adapted to the styling of the vehicle.

Rear-view devices having lighting devices for providing a signal such as a turn signal, warning light, fog light etc. are commonly used in a vehicle. These lighting devices not only enhance or extend the functionality of the rear-view devices, but also provide aesthetic appeal to the vehicle. The lighting devices of the rear-view devices may include a light source such as a light emitting diode (LED) and a lightguide which gets illuminated to provide a signal outside the vehicle. These lighting devices may further be enhanced to emit a pattern of light, which not only provides lighting functionality to the vehicle but also provides aesthetic appeal and enhances styling of the vehicle.

SUMMARY

An example object of the present disclosure is to further enhance the aesthetic appeal and styling of the known lighting devices for rear-view devices of motor vehicles.

This object may be achieved by a lighting device of a rear-view device adapted to be used with a vehicle comprising: at least two light sources arranged to emit light beams, wherein the at least two light sources comprise a first light source and a second light source, and the light beams comprise a first beam of light, in particular of a first color, and a second beam of light, in particular of a second color different from the first color; at least two lightguides, wherein the at least two lightguides comprises a first lightguide and a second lightguide; a housing, wherein the housing comprises an upper portion, a lower portion and a supporting element for, in particular detachably, supporting the at least two light sources and/or the at least two light guides; at least one reflective element, wherein the at least one reflective element is arranged to reflect at least a part of the light beams from one of the at least two light sources and is supported by the supporting element; a transparent lens arranged at least partly between the upper portion and the lower portion of the housing; and at least one pattern generating element configured to generate at least one light pattern using at least a part of the light beams from one of the at least two light sources.

It is proposed that the first light source may be integrally coupled with the first lightguide to emit the first beam of light in a first light portion, and the second light source may be integrally coupled with the second lightguide to emit the second beam of light in a second light portion, wherein especially the first light portion and the second light portion are arranged substantially parallel to each other.

Further it is proposed that the second light source may be disposed between the first light source and the at least one reflective element, and/or the second lightguide may be disposed between the supporting element and the first lightguide, and/or the second light source and/or the second lightguide is configured to create an indirect light effect.

Embodiments of the invention can be characterized in that the first light source is a color changing light source and/or cooperates with a color changing element, and/or the second light source is a color changing light source and/or cooperates with a color changing element.

Also embodiments can be characterized in that the first light guide comprises the transparent lens, and/or the first light guide extends towards the bottom of the rear-view device, and/or the first light guide is configured to allow the second light beam to pass-through the transparent lens after being reflected from the at least one reflective element.

Further, it is proposed that the at least one pattern generating element may be configured on or provided by the transparent lens, and/or the at least one pattern generating element may be configured on or provided by the at least one reflective element, and/or the at least one pattern generating element may be configured to be at the second light portion.

In this respect it is also proposed that the at least one reflective element may be configured with the at least one pattern generating element for generating at least one light pattern using the second light beam.

Embodiments may be defined in that the at least one pattern generating element is one of at least one mask, at least one 2D/3D contour on the at least one reflective element, and at least one cut-out on the at least one reflective element for making a pattern, logo, symbol, icon or text.

In this respect it is proposed that the at least one pattern generating element may be either spread completely on the at least one reflective element or partially to at least one portion of the at least one reflective element.

Still further, embodiments may comprise further comprising a light blocking element sandwiched in-between the first light source and the second light source in order to block light beams towards each other.

It is also proposed that the at least two light sources may be arranged behind the housing, in particular behind the upper portion the housing, and/or at least one of the at least two light sources comprises a color changing light source and/or cooperates with a color changing element, and/or at least one of the at least two light sources is switchable between an on and an off state.

The lighting device of the present disclosure may be a multi-purpose lighting device exposing light towards the exterior of the rear-view device in order to achieve a direct light emission and an indirect light emission. The lighting device uses at least two light sources to emit light in a single output direction. At least one of the light sources may be hidden from the direct view from the outside of the rear-view device in order to achieve desired light aesthetics while also allowing a better packaging of the rear-view device arrangement.

A first light source may be coupled with a first light guide to provide a uniform distribution of a first light beam emitted by the first light source. A second light source may be coupled with a second light guide for uniform distribution of a second light beam emitted by the second light source. The second light beam may be reflected back using at least one reflective element placed, for example, below the second light guide such that the second light beam emitted from the second light guide reflects from the at least one reflective element and exits from the bottom of the first light guide.

Further, a transparent lens may extend from the first light guide towards the bottom end of the rear-view device such that the second light beam may exit the rear-view device only after being reflected from the at least one reflective element. The second light source coupled with the second light guide may be hidden behind first light source and the first light guide in order to provide a dim/indirect/holographic output of the second light beam.

Thus, two portions may be provided by light emitted by two light sources, a first light portion being directly illuminated and the second light portion being indirectly illuminated. Said two light portions may run in parallel, preferably substantially horizontally when the lighting device together with the rear-view device comprising the same is mounted to a vehicle.

According to the present disclosure the at least one pattern generating element may be provided by the reflective element or on a lens, which may be formed by the first light guide.

The present disclosure also provides a rear-view device comprising at least one lighting device according to embodiments of the present disclosure.

The present disclosure also provides a vehicle comprising at least one rear-view device having at least one lighting device according to embodiments of the present disclosure.

Other aspects, advantages, and salient features of the present disclosure will become apparent to those skilled in the art from the following detailed description, which taken in conjunction with the annexed figures, discloses exemplary embodiments of the disclosure, wherein:

DETAILED DESCRIPTION

It is to be understood that the embodiments described are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1A:
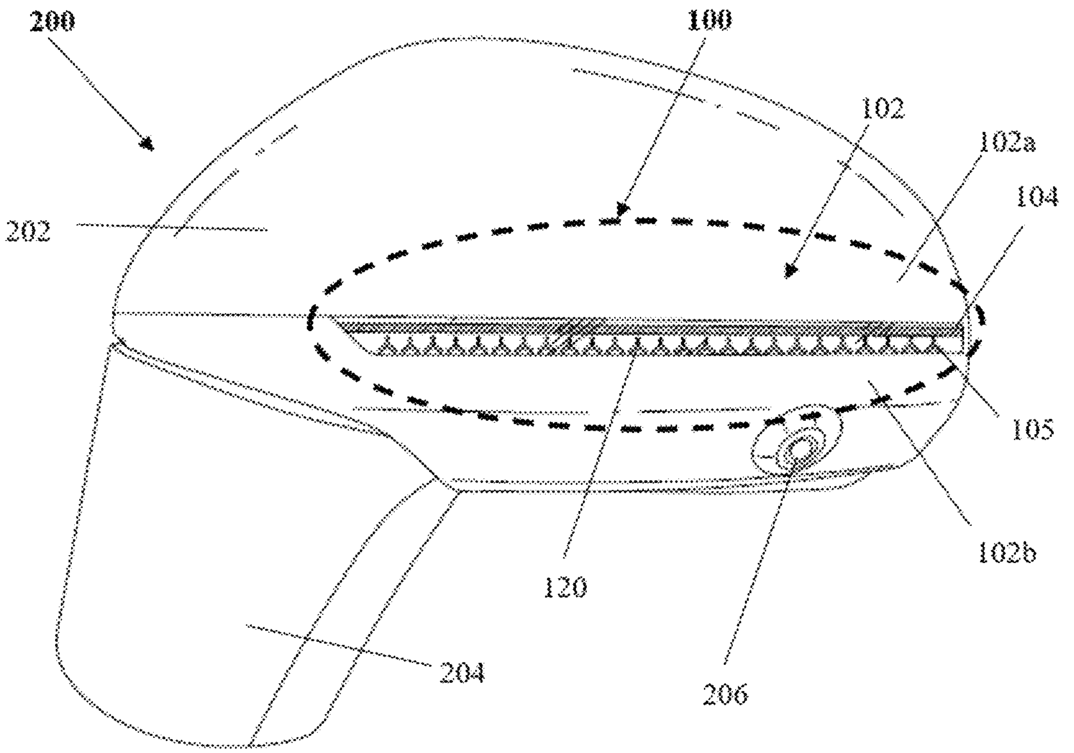
FIGS. 1*a* and 1*b*: illustrate front views of a rear-view device and a front portion of said rear-view device of a vehicle with a lighting device, in accordance with an embodiment of the present disclosure, respectively.
Figure 1B:
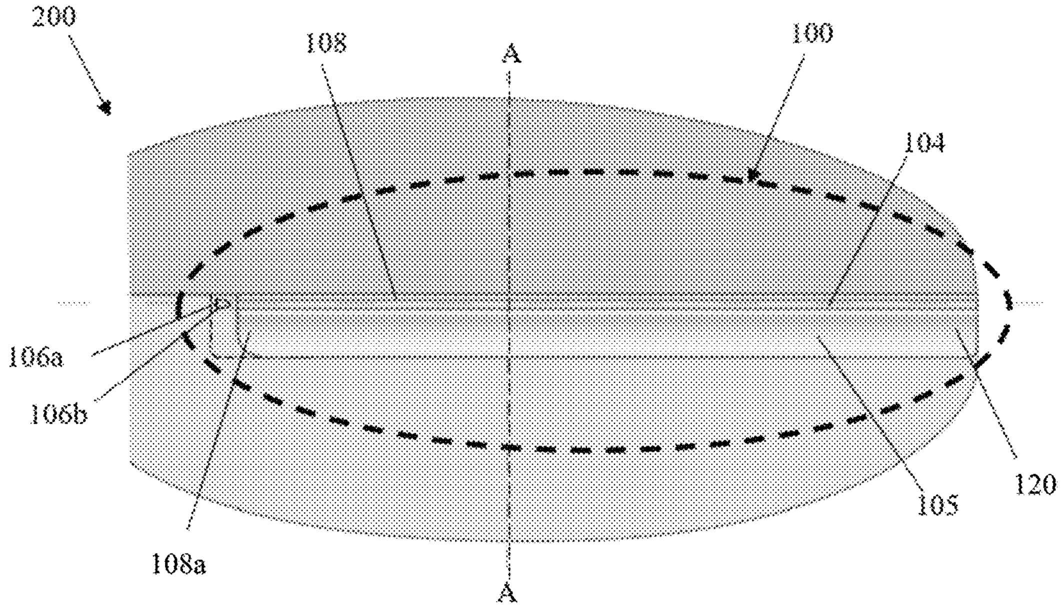
Figure 5:
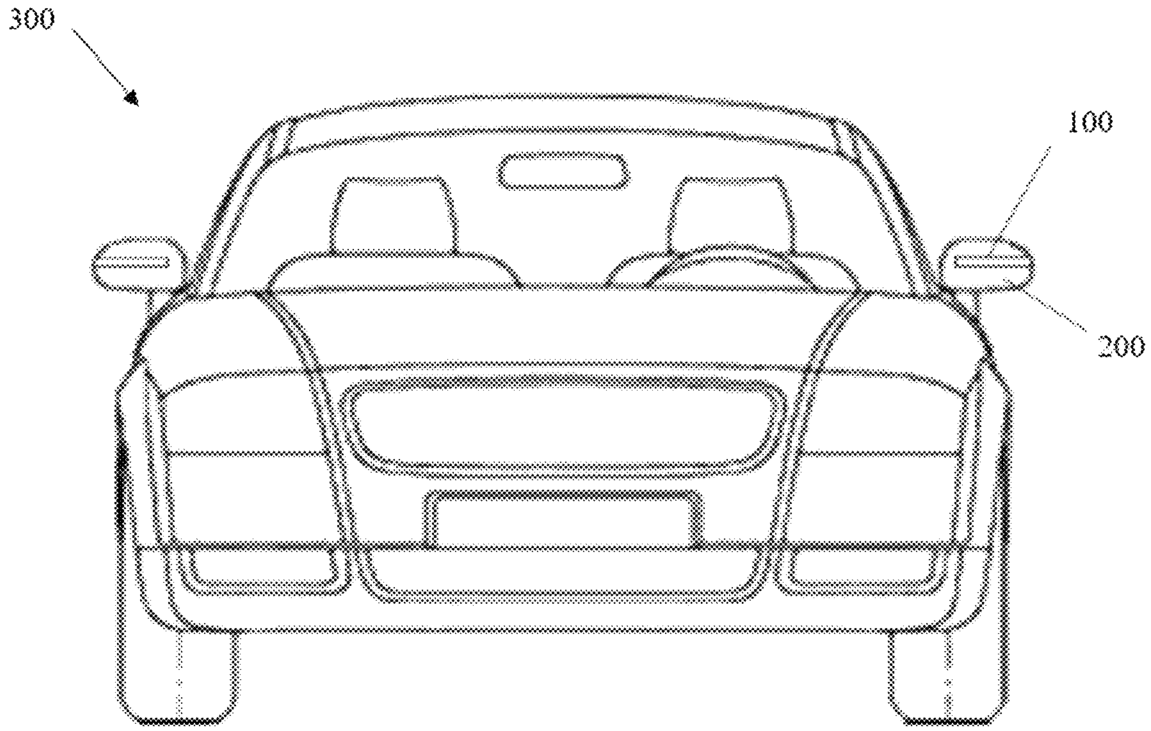
FIG. 5 illustrates a front view of a vehicle showing the rear-view device of FIGS. 1*a* and 1*b* and the lighting device according to the present disclosure.

FIGS. 1*a* and 1*b*. illustrate of a rear-view device 200 of a vehicle 300 with a lighting device 100, with the vehicle 300 being shown in FIG. 5. The rear-view device 200 comprises a head portion 202 and a base portion 204. In an embodiment, the rear-view device 200 is mounted on the vehicle 300 on either side of the vehicle 300 coupled by the base portion 204, wherein the base portion 204 may be of various designs including but not limited to a door-mounted design, a window-mounted design etc. The rear-view device 200 is configured to view the surrounding of the vehicle 300, particularly a rear-view of the vehicle 300. The rear-view device 200 may comprise a mirror (not shown). The rear-view device 200 may also comprise at least one camera 206 for obtaining the rear-view of the vehicle 300 to be displayed as image or video by a display unit (not shown) mounted within the cabin of the vehicle 300. The rear-view device 200 also comprises a lighting device 100. The lighting device 100 may be used to provide at least one of a turn light signal, warning signal, breakdown signal, coming-home signal, autonomous driving mode, parking signal, positioning lighting, and welcome signal. In addition to providing said signals, the lighting device 100 may also enhance the aesthetic appeal of the vehicle 300 according to the present disclosure.

In the illustrated embodiment in FIGS. 1*a* and 1*b*, two light outputs are visible one at the top in form of a first light portion 104 and one at the bottom in form of a second light portion 105 of the lighting device 100. The outputs from the two light portions 104, 105 which enhances the aesthetic appeal and styling of the vehicle 300. This is even more the case when making usage of a pattern generating element 120 explained in further detail below.

The lighting device 100 comprises a housing 102. The housing 102 may at least partially constitute an outer portion of the rear-view device 200. The housing 102 may be made of an opaque material such as polymer, metal, alloys and various natural material. The housing 102 comprises an upper housing portion 102*a* and a lower housing portion 102*b*, see also FIGS. 2. The upper housing portion 102*a* and/or the lower housing portion 102*b* has a cutout which allows the light from the lighting device 100 to exit from the rear-view device 200.

FIGS. 1*a*, 1*b* show a portion of the rear-view device 200 illustrating the lighting device 100. The lighting device 100 comprises two light source 106*a* and 106*b*, which may be disposed behind the housing 102 such that the two light sources 106*a* and 106*b* are not visible from the outside as illustrated in FIG. 1*a*, with the portion behind the housing 102 being shown within a dashed line in FIG. 1*b* to illustrate the position and arrangement of the two light sources 106*a* and 106*b* within the housing 102.

Figure 2:
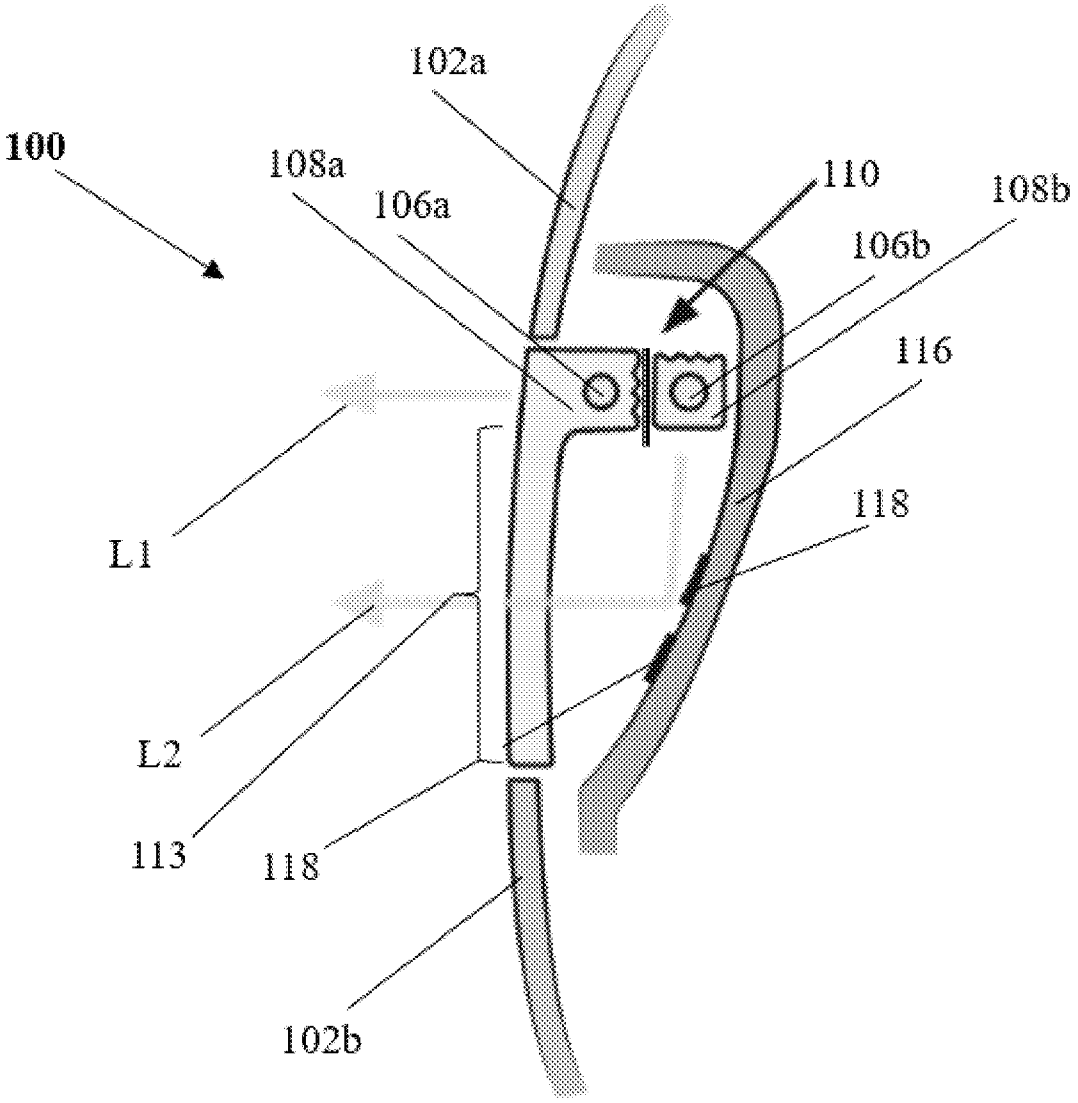
FIG. 2: illustrates a cross-sectional view along section line A-A of the lighting device of FIGS. 1*a* and 1*b;*

Further, as shown in the FIG. 2, the second light source 106*b* is sandwiched between a supporting element 116 of the housing 102 and the first light source 106*a* such that the second source 106*b* is hidden and may create an indirect light effect. The two light sources 106*a* and 106*b* may comprise, but are not limited to a semiconductor light emitting diode (LED) or laser diode, an OLED, polymer light emitting diode (PLED), an LED lamp package, LED chip or LED die, or an array of one or more of these devices.

In an embodiment, the two light sources 106*a* and 106*b* may be pre-configured with different colors in order to create a visual difference to the observer looking at the lighting device 100 and differentiating between the purpose of the light, wherein e.g. the first light source 106*a* may be yellow/orange to generate a turn light signal, while the second light source 106*b* may be blue to generate a coming home light. In an alternative embodiment, the two light sources 106*a* and 106*b* may include a color changing LED to obtain various color outputs through one LED. The advantage of using a color changing LED as a light source is that multiple color light may be emitted from the lighting device for indicating different functionalities and/or to enhance aesthetic appeal of the vehicle. For example, to emit a turn light signal the LED may be switched to yellow color, to emit a coming home signal the LED may be switched to blue color, or to emit a warning signal the LED may be switched to red color.

Figure 3A:
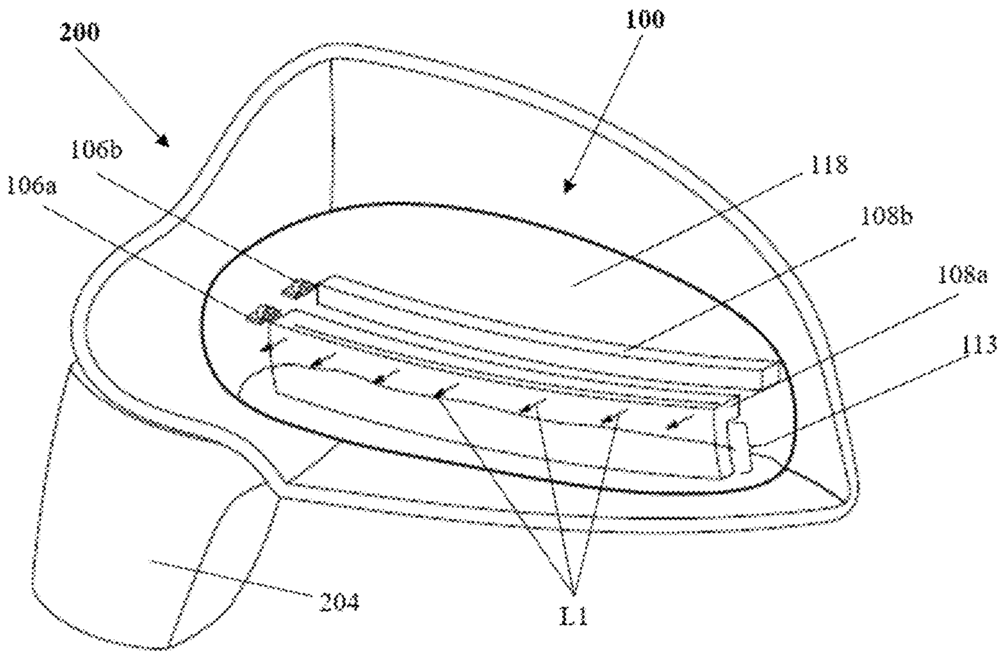
FIGS. 3*a* and 3*b*: illustrate isometric cut-out views of the rear-view device of FIGS. 1*a* and 1*b*, showing light beams illuminated from a first light source and a second light source of the lighting device.

The lighting device 100 further comprises two lightguides i.e. a first lightguide 108*a* and a second lightguide 108*b*. The first lightguide 108*a* is coupled with the first light source 106*a* such that the first lightguide 108*a* uniformly emits throughout a portion of the length of the first lightguide 108*a*, in particular an upper portion, a first light beam L1 coming from the first light source 106*a*, see FIGS. 2 and 3*a*. Further, the second lightguide 108*b* is coupled with the second light source 106*b* such that the second lightguide 108*b* uniformly emits throughout another portion of the length of the first lightguide 108*a*, in particular a lower portion, a second light beam L2 coming from the second light source 106*b*, also illustrated in FIGS. 2 and 3*b*.

Figure 3B:
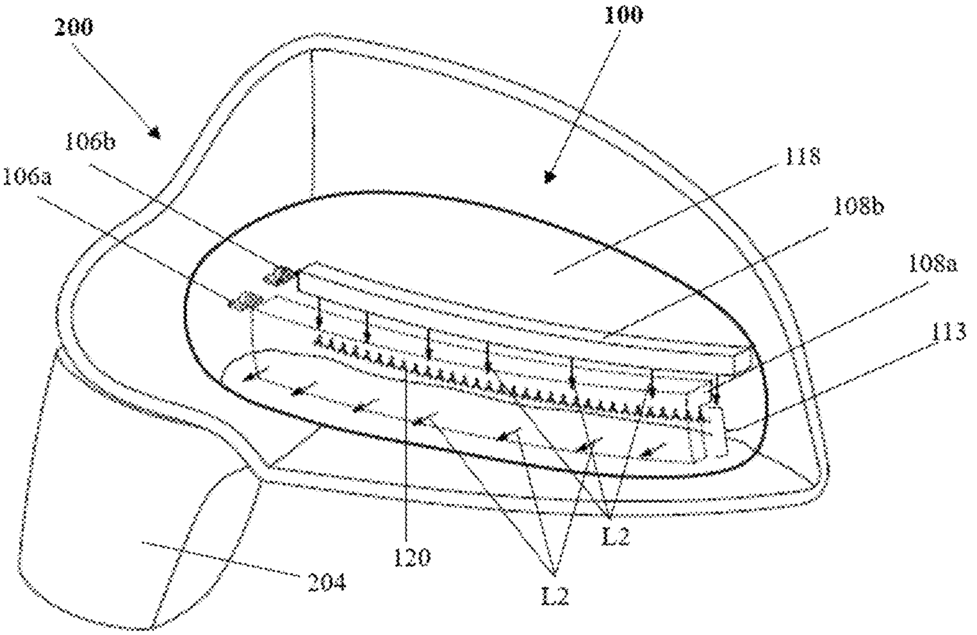

As illustrated in FIGS. 2 and 3*b*, at first the second lightguide 108*b* emits the second light beam L2 towards the bottom end of the rear-view device 200, then the second light beam L2 is reflected by at least one reflective element 118 and indirectly emitted towards the outer direction of the rear-view device 200 as shown by the path of second light source L2 all the way through the other portion (lower portion) of the first lightguide 108*a* forming a transparent lens 113. The transparent lens 113 extends from the upper portion of the first lightguide 106*a* emitting the first light beam L1 towards the bottom end of the rear-view device 200. The transparent lens 113 also serves as a cover preventing dust or debris to enter within the compartment of the second lightguide 108*b* and the reflective element 118. While the lens 113 is shown to be formed together with the first light guide 108*a* in FIG. 2, it may also be provided as additional part attached to the housing portions 102*a*, 102*b* (not shown).

Further, as shown in the FIG. 2, the second lightguide 108*b* is sandwiched between the supporting element 116 and the first lightguide 108*a* such that the second lightguide 108*b* is hidden and may create an indirect light effect. Furthermore, the lighting device 100 may comprise a light blocking element 110, placed between the first lightguide 108*a* and the second lightguide 108*b*, in order to block light to be transferred between the first lightguide 108*a* and the second lightguide 108*b*.

The two lightguides 108*a* and 108*b* are detachably mounted on the housing 102 at the lightguide supporting element 116. The lightguide supporting element 116 is the part of the housing 102 that is configured to support and fix the lightguides 108*a* and 108*b*. The lightguides 108*a* and 108*b* are mounted on the lightguide supporting element 116 via at least one of a screw, nut, adhesive, snap-fit, butt strap joint, clamping connection, plug connection etc. (not shown).

The reflective element 118 may be disposed on the housing 102, in particular the supporting element 116 thereof, such that the reflective element 118 is configured to face the transparent lens 113, as shown in FIG. 2. The reflective element 118 is configured to direct light toward s the outside of the lighting device 100. The reflective element 118 may also be configured with the at least one pattern generating element 120 for emitting light in the form of a pattern, logo, symbol, icon, text or combination thereof, as shown in FIGS. 1*a* and 3*b*. The at least one pattern generating element 120, configured on the at least one reflective element 118, is adapted to generate at least one light pattern using the second light beam L2. The pattern generating element 120 is one of at least one mask, at least one contour on the at least one reflective element 118, and at least one cut-out on the at least one reflective element 118 for making the pattern, logo, symbol, icon or text. The pattern generating element 120 is either spread completely on the at least one reflective element 118 or partially.

The pattern, logo, symbol, icon, text or combination thereof generated by the pattern generating element 120 is shown in FIGS. 1*a*, 3*b*, 4*a*, and 4*b*. In these embodiments the reflective element 118 includes the pattern generating element 120 such that when light falls on the reflective element 118 having the pattern generating element 120, the reflected light is emitted in the form of the pattern logo, symbol, icon, text or combination thereof. The pattern generating element 120 may include at least one of a laser printed portion, a cut-out, a masked portion, and/or etched, 3D printed, inkjet printed, molded 2D or 3D painted shapes for making the pattern, logo, symbol, icon or text.

In an alternative embodiment, the pattern generating element 120 may be configured on the transparent lens 113 to create the same effect as explained above.

Figure 4A:
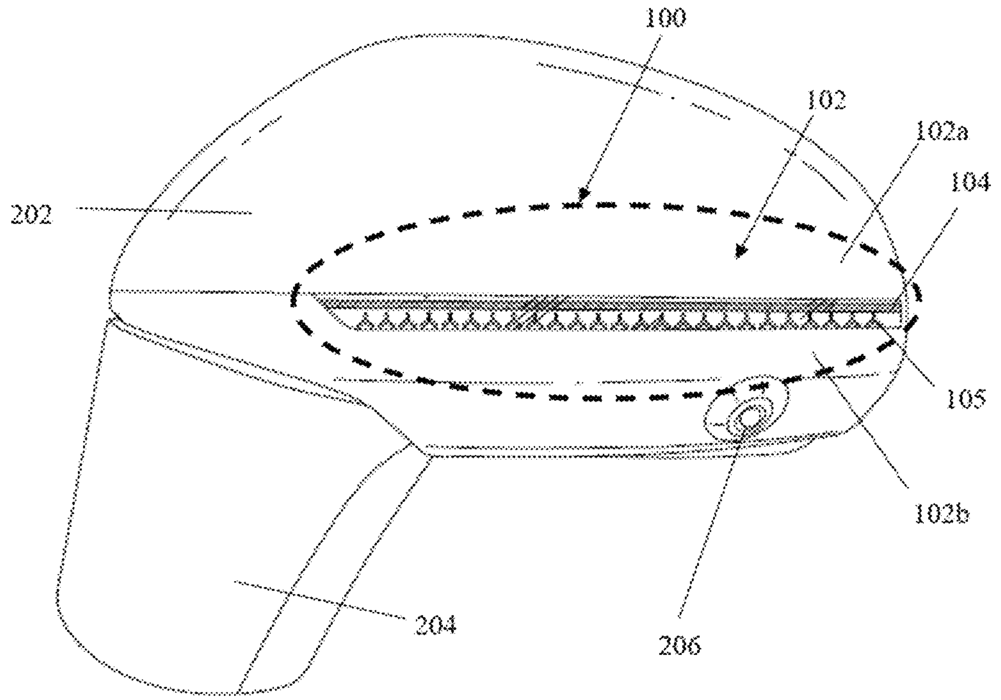
FIGS. 4*a* and 4*b*: illustrate front views of the rear-view device of FIGS. 1*a* and 1*b* of the vehicle illustrating the first light source and the second light source of the lighting device being switched on, respectively.
Figure 4B:
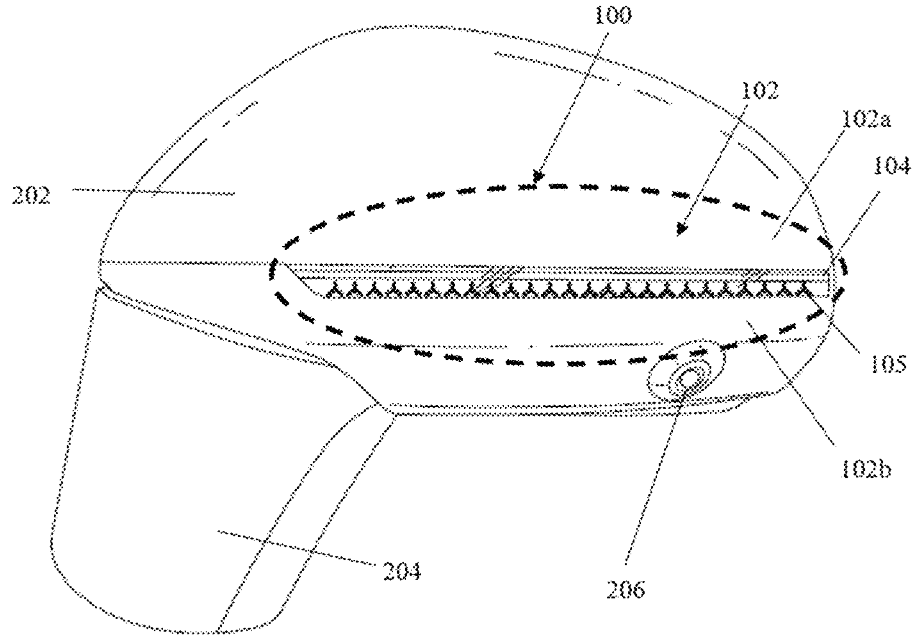

FIG. 4*a* illustrates the lighting device 100 having the first light source 6*a* in a switched-ON state and the second light source in the switched-OFF state. FIG. 4*b* illustrates the lighting device 100 having the first light source 6*a* in a switched-OFF state and the second light source in the switched-ON state. As explained in the illustration section for FIG. 1*a*, the first light source 106*a* is responsible for illuminating the first light portion 104 while the second light source 106*b* is responsible for illuminating the second light portion 105. Therefore, as illustrated in FIG. 4*a*, when the first light source 6*a* is in a switched-ON state and the second light source is in the switched-OFF state, the first portion

104 of the lighting device 100 glows/illuminates, whereas the pattern generating element 120 can be seen through the lens 113. The first light portion 104 may be indicative of a hazard light or a turn indicator light.

As illustrated in FIG. 4*b*, when the first light source 6*a* is in a switched-OFF state and the second light source is in the switched-ON state, the second portion 105 of the lighting device 100 glows/illuminates creating an indirect lighting effect since the arrangement of components including the second light guide 108*b*. The reflective element 118 is configured such that the second light beam L2 emitted from the second light source 106*b* and evenly distributed by the second light guide 108*b* is directed in the bottomward direction and falls on the reflective element 118, having the pattern generating element 120, which is set at an angle in order for the second light beam L2 to emit through the transparent lens 113 and as a result a dimmed or hologram like, 2D/3D image or text pattern is visible. The angle between the reflective element 118 and the second light beam L2 may be between 20 and 80°.

FIG. 5 illustrates a front view of the vehicle 300 showing the rear-view device 200 and the lighting device 100 according to the present disclosure. The lighting device 100 may be disposed on or integrated in the rear-view device 200. The vehicle 300 may comprise two rear-view devices, one on the left side and the other on the right side of the vehicle 300.

Although the subject matter of the present disclosure has been described in language specific to structural features and/or acts, it is to be understood that the subject matter defined in the appended claims is not necessarily limited to the specific features or acts described above.

Rather, the specific features and acts described above are disclosed as examples of implementing the claims and other equivalent features and acts are intended to be within the scope of the claims. I.e. the features disclosed in the foregoing description, the claims, and the drawings may be essential, both individually and in any combination, for accomplishing the present disclosure in its various embodiments. The embodiments shown herein are only examples of the present disclosure and must therefore not be understood as being restrictive. Alternative embodiments considered by the skilled person are equally covered by the scope of protection of the present disclosure.

REFERENCE SIGNS

100: lighting device
102: housing
102*a*: upper portion of housing
102*b*: lower portion of housing
104: first light portion
105: first light portion
106*a*: first light source
106*b*: second light source
108*a*: first lightguide
108*b*: second lightguide
110: light blocking element
113: transparent lens
116: lightguide supporting element
118: reflective element
120: pattern generating element
200: rear-view device
202: head portion of rear-view device
204: base portion of rear-view device
206: camera
300: vehicle L1: first light beam L2: second light beam A-A: section line of FIG. 1*b*

It is claimed:

1. A lighting device of a rear-view device for a vehicle, comprising:

at least two light sources configured to emit light beams, wherein the at least two light sources comprise a first light source and a second light source, and the light beams comprise a first beam of light of a first color and a second beam of light of a second color different from the first color;

at least two lightguides, wherein the at least two lightguides comprise a first lightguide and a second lightguide;

a housing, wherein the housing comprises an upper portion, a lower portion, and a supporting element for detachably supporting the at least two light sources and/or the at least two light guides;

at least one reflective element, wherein the at least one reflective element is configured to reflect at least a part of the light beams from one of the at least two light sources and is supported by the supporting element;

a transparent lens disposed at least partly between the upper portion and the lower portion of the housing; and at least one pattern generating element configured to generate at least one light pattern using at least a part of the light beams from one of the at least two light sources, wherein the first light source is integrally coupled with the first lightguide to emit the first beam of light in a first light portion, the second light source is integrally coupled with the second lightguide to emit the second beam of light in a second light portion, and the first light portion and the second light portion are disposed parallel or substantially parallel to each other, and wherein the second light source is disposed between the first light source and the at least one reflective element, the second lightguide is disposed between the supporting element and the first lightguide, and the second light source and the second lightguide are configured to create an indirect light effect.

2. The lighting device according to claim 1, wherein the first light source is a color changing light source and/or cooperates with a color changing element, and/or the second light source is a color changing light source and/or cooperates with a color changing element.

3. The lighting device according to claim 1, wherein the first light guide comprises the transparent lens, the first light guide extends towards the bottom of the rear-view device, and/or the first light guide is configured to allow the second light beam to pass through the transparent lens after being reflected from the at least one reflective element.

4. The lighting device according to claim 1, wherein the at least one pattern generating element is configured on or provided by the transparent lens, the at least one pattern generating element is configured on or provided by the at least one reflective element, and/or the at least one pattern generating element is configured to be seen at the second light portion.

5. The lighting device according to claim 4, wherein the at least one reflective element is configured with the at least one pattern generating element for generating at least one light pattern using the second light beam.

6. The lighting device according to claim 4, wherein the at least one pattern generating element is one of at least one mask, at least one 2D/3D contour on the at least one reflective element, or at least one cut-out on the at least one reflective element for making a pattern, logo, symbol, icon or text.

7. The lighting device according to claim 6, wherein the at least one pattern generating element is either spread completely on the at least one reflective element or partially to at least one portion of the at least one reflective element.

8. The lighting device according to claim 1, further comprising a light blocking element disposed between the first light source and the second light source in order to block light beams towards each other.

9. The lighting device according to claim 1, wherein the at least two light sources are arranged behind the upper portion of the housing, and/or at least one of the at least two light sources is switchable between an on and an off state.

10. A rear-view device comprising at least one lighting device according to claim 1.

11. The rear-view device according to claim 10, further comprising a control unit for controlling at least one of the at least two light sources.

12. A vehicle comprising at least one rear-view device according to claim 10.

* * * * *